United States Patent
Blank et al.

(10) Patent No.: US 7,121,636 B2
(45) Date of Patent: Oct. 17, 2006

(54) ENDLESS TRACK FOR PAVING VEHICLES

(75) Inventors: Mikel A. Blank, Charleston, IL (US); Chad M. Larson, Mattoon, IL (US); Thomas A. Roth, Lerna, IL (US)

(73) Assignee: Ingersoll-Rand Company, Shippensburg, PA (US)

( * ) Notice: Subject to any disclaimer, the term of this patent is extended or adjusted under 35 U.S.C. 154(b) by 0 days.

(21) Appl. No.: 10/234,806

(22) Filed: Sep. 4, 2002

(65) Prior Publication Data

US 2003/0047995 A1 Mar. 13, 2003

Related U.S. Application Data

(60) Provisional application No. 60/317,400, filed on Sep. 4, 2001.

(51) Int. Cl.
*B62D 55/24* (2006.01)

(52) U.S. Cl. ...................... 305/165; 305/178

(58) Field of Classification Search ............... 180/9.1, 180/10; 305/185, 165, 167, 170, 52–53, 305/193, 124, 125, 129, 130–131, 178; 301/185, 301/165, 167, 170, 52–53, 193, 124, 125, 301/129, 130–131
See application file for complete search history.

(56) References Cited

U.S. PATENT DOCUMENTS

| | | | |
|---|---|---|---|
| 3,118,709 A * | 1/1964 | Case ........................ 305/170 |
| 3,472,563 A * | 10/1969 | Irgens ....................... 305/112 |
| 3,612,625 A | 10/1971 | Huber |
| 3,619,012 A | 11/1971 | Bizier et al. |
| 3,637,266 A | 1/1972 | Busse |
| 3,711,165 A * | 1/1973 | Russ, Sr. .................... 305/178 |
| 4,087,135 A * | 5/1978 | Unruh ........................ 305/125 |
| 4,093,318 A | 6/1978 | Edwards |
| 4,953,919 A * | 9/1990 | Langford .................... 305/144 |
| 5,373,909 A | 12/1994 | Dow et al. |
| 5,622,234 A * | 4/1997 | Nagorcka et al. ............ 180/9.5 |
| 5,913,374 A | 6/1999 | Becker et al. |
| 6,000,766 A | 12/1999 | Takeuchi et al. |
| 6,047,785 A | 4/2000 | Snyder et al. |
| 6,068,354 A | 5/2000 | Akiyama et al. |
| 6,079,802 A * | 6/2000 | Nishimura et al. ......... 305/157 |
| 6,106,083 A | 8/2000 | Ono |
| 6,241,327 B1 | 6/2001 | Gleasman et al. |
| 6,322,172 B1 * | 11/2001 | Lussier ....................... 305/160 |
| 6,352,320 B1 * | 3/2002 | Bonko et al. ............... 305/178 |
| 6,364,437 B1 * | 4/2002 | Phely ......................... 305/116 |
| 6,533,371 B1 * | 3/2003 | Hori et al. .................. 305/191 |

* cited by examiner

*Primary Examiner*—Jason R. Bellinger
(74) *Attorney, Agent, or Firm*—Michael Best & Friedrich LLP

(57) ABSTRACT

A drive track is for a wheel train for mobilizing a paving vehicle upon a ground surface, the wheel train including a drive wheel and a bogie wheel. The track includes an endless body disposable about the wheel train and having a driven portion engageable by the drive wheel such that the drive wheel circulates the track about the wheel train. A generally annular rail portion is connected with the drive portion and has a continuous inner circumferential surface contactable with the bogie wheel, such that the bogie wheel rolls along the inner surface, and a continuous outer circumferential surface contactable with the ground surface. The rail portion supports the bogie wheel above the ground surface such that when the track circulates about the wheel train, a distance between the bogie wheel axis and the ground surface remains substantially constant as the bogie wheel rolls along the rail inner surface.

3 Claims, 6 Drawing Sheets

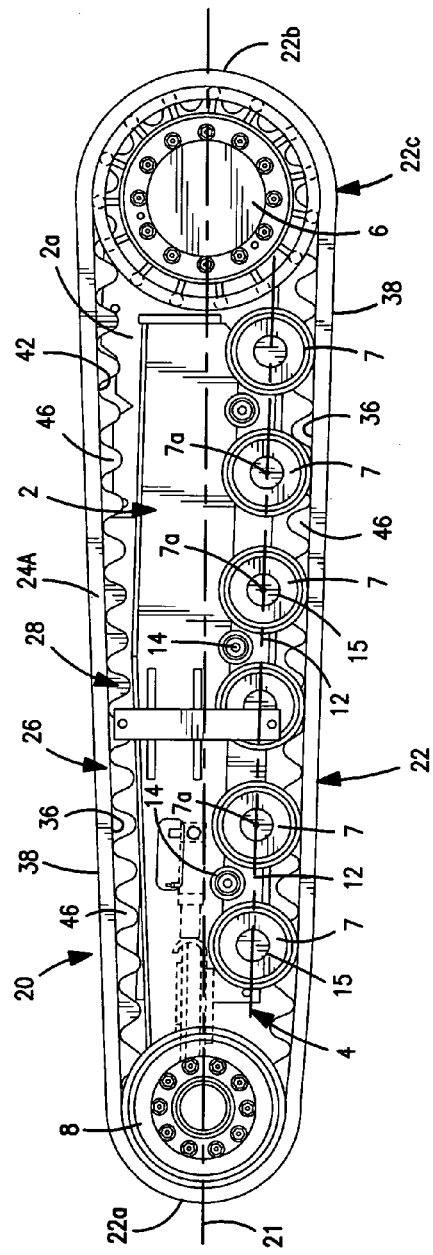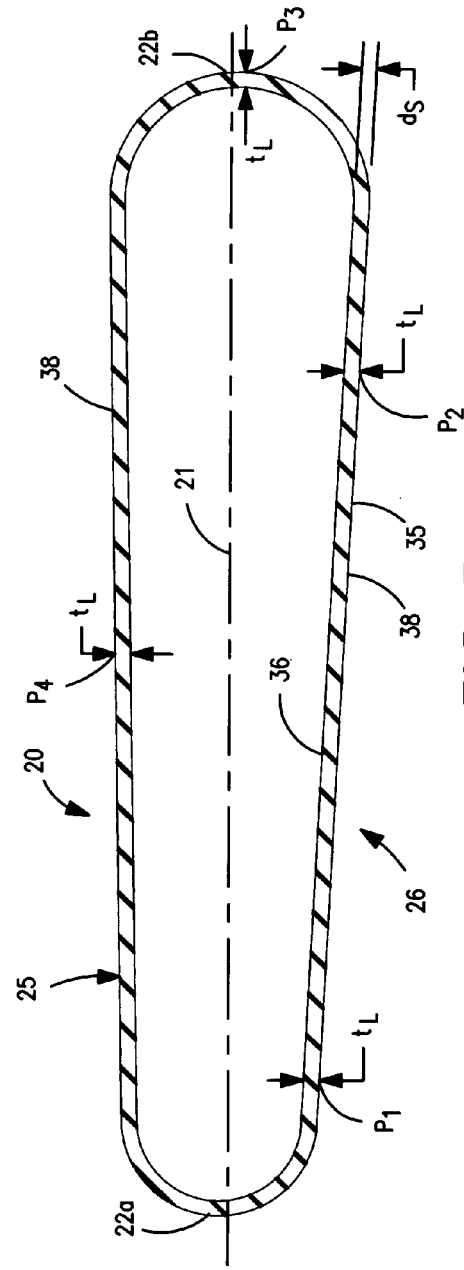

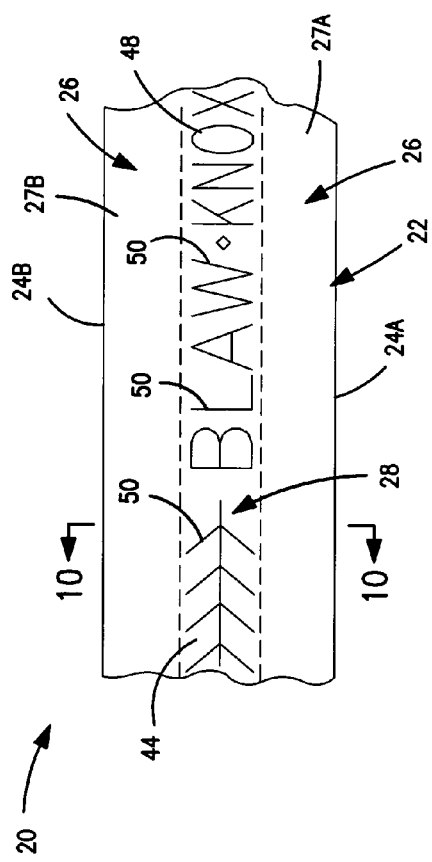
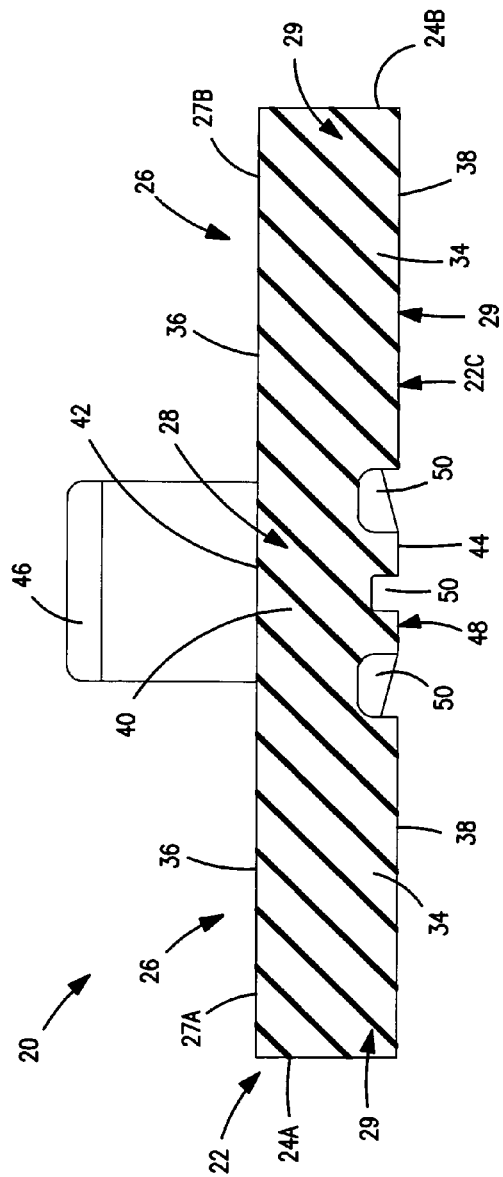

US 7,121,636 B2

ENDLESS TRACK FOR PAVING VEHICLES

This application claims the benefit of U.S. Provisional Application No. 60/317,400 filed Sep. 4, 2001.

BACKGROUND OF THE INVENTION

The present invention relates to construction vehicles, and more particularly to endless tracks or crawlers used to propel such vehicles.

Referring to FIGS. 1–4, tracked construction vehicles 1 are known and basically include a chassis 2 and one or more working tools 3, such as for example, a screed 3 towed from the rear of the chassis 2 with a paving-type construction vehicle 1. Tracked construction vehicles 1 also generally include a pair of wheel trains 4 (one shown) each mounted to a separate lateral side 2a (one shown) of the chassis 2 and two "crawlers" or endless tracks 5 (one shown) each encircling one of the wheel trains 4. Each wheel train 4 typically includes a drive wheel 6, several roller or "bogie" wheels 7 and a take-up wheel 8 (although a second drive wheel may alternatively be provided). Typically, the bogie wheels 7 and the take-up wheels 8 are arranged in laterally spaced-apart pairs that are mounted on common or collinear axles, as best shown in FIG. 3.

The tracks 5 are typically constructed as either a belt of linked together metal plates, typically of low carbon steel (not shown), or as a continuous or endless band or belt of a polymeric material (as depicted), such as natural or synthetic rubber. The polymeric tracks 5 are generally of one-piece construction in the form of a continuous belt 9 of material having a generally ovular or elliptical shape when mounted about a wheel train 4. Each belt 9 has an outer surface 9a which contacts the roadway or other ground surface S on which the paver 1 travels and an inner surface 9b which contacts and slides against the various wheels 6, 7 and 8 of the wheel train 4. A plurality of teeth or lugs 10 project radially inwardly from the belt inner surface 9b and engage with teeth/lugs (not shown) of the drive wheel 6 such that the drive wheel 6 pulls the track 5 to circle about the wheel train 4, the circling track 5 in turn pulling the paver 1 along the ground surface S.

As best shown in FIG. 3, each endless track 5 includes a tread pattern 11 formed in the belt outer surface 9a to increase frictional engagement or "traction" between the track 5 and roadway or other surface S upon which the paver 1 is travelling. Such tread patterns 11 typically include one or more longitudinally-extending or "longitudinal" recesses 12 that extend generally about the entire circumference of the belt 9. Further, the tread pattern 11 includes a plurality of generally transversely-extending or "transverse" recesses 13 which each extend across the width of the belt 9 and to one or both side edges 9c of the belt 9.

It has been generally believed to be necessary to provide known polymeric endless tracks 5 with the above-described transverse recesses 13 so that sufficient traction may be generated between the tracks 5 and a ground surface S to enable the tracks 5 to pull a paving vehicle 1 across or along the surface S. Further, these transverse recesses 13 also provide channels for removal of debris, such as small rocks or stones, that could become trapped in the tread pattern 11 and adversely affect the track functioning. For these reasons, paving vehicle manufactures have generally considered it necessary to provide polymeric-tracked paving vehicles 1 with tracks 5 having transverse recesses 13.

SUMMARY OF THE INVENTION

In a first aspect, the present invention is a drive track for a wheel train for mobilizing a construction vehicle upon a ground surface. The wheel train includes a drive wheel and a bogie wheel, the bogie wheel being rotatable about a central axis. The track comprises an endless body disposable about the wheel train and engageable by the drive wheel such that the drive wheel circulates the track about the wheel train. The body includes a generally annular rail portion having a substantially continuous inner circumferential surface. The inner surface is contactable with the bogie wheel such that the bogie wheel is rollable along the rail inner surface. Further, the rail portion includes a substantially continuous outer circumferential surface contactable with the ground surface. The rail portion is configured to support the bogie wheel above the ground surface such that when the track circulates about the wheel train, a distance between the bogie wheel axis and the ground surface remains substantially constant as the bogie wheel rolls along the rail inner surface.

In another aspect, the present invention is also an endless drive track for a wheel train for mobilizing a construction vehicle upon a ground surface, the wheel train including a drive wheel and a bogie wheel. The drive track comprises a generally annular driven portion engageable by the drive wheel such that the drive wheel circulates the track about the wheel train and an endless rail portion connected with the driven portion. The rail portion has a generally annular body with a circumference and a substantially continuous inner circumferential surface disposed on a first side of the body and contactable with the bogie wheel. The rail further includes a substantially continuous outer circumferential surface disposed on a second, opposing side of the body and contactable with the ground surface. The rail body has a substantially constant thickness such that a spacing distance between the inner and outer rail surfaces at any point on the circumference is substantially equal to the spacing distance between the two surfaces at any other point on the circumference.

In yet another aspect, the present invention is also a drive track for a wheel train for mobilizing a paving vehicle upon a ground surface. The wheel train includes a drive wheel and a bogie wheel, the bogie wheel being rotatable about a central axis. The track comprises an endless body disposable about the wheel train and engageable by the drive wheel such that the drive wheel circulates the track around the wheel train. The body includes a generally annular rail portion configured to rotate the bogie wheel about the wheel central axis. The rail portion has a substantially continuous inner circumferential surface, the inner surface being contactable with the bogie wheel such that the bogie wheel is rollable along the rail inner surface, and a substantially continuous outer circumferential surface contactable with the ground surface. Further, the rail portion has a substantially constant thickness such that when the track circulates about the wheel train, a distance between the bogie axis and the ground surface remains substantially constant as the bogie wheel rolls upon the rail inner surface.

BRIEF DESCRIPTION OF THE SEVERAL VIEWS OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings:

FIG. 5 is a side elevational view of a paving vehicle wheel train with an endless track in accordance with the present invention;

FIG. 7 is a longitudinal cross-sectional view of the present drive track;

FIG. 9 broken-away side view of the drive track of the present invention shown with a first tread pattern;

FIG. 10 is a transverse cross-sectional view of the present drive track through line 10—10 of FIG. 9;

DETAILED DESCRIPTION OF THE INVENTION

Figure 1:
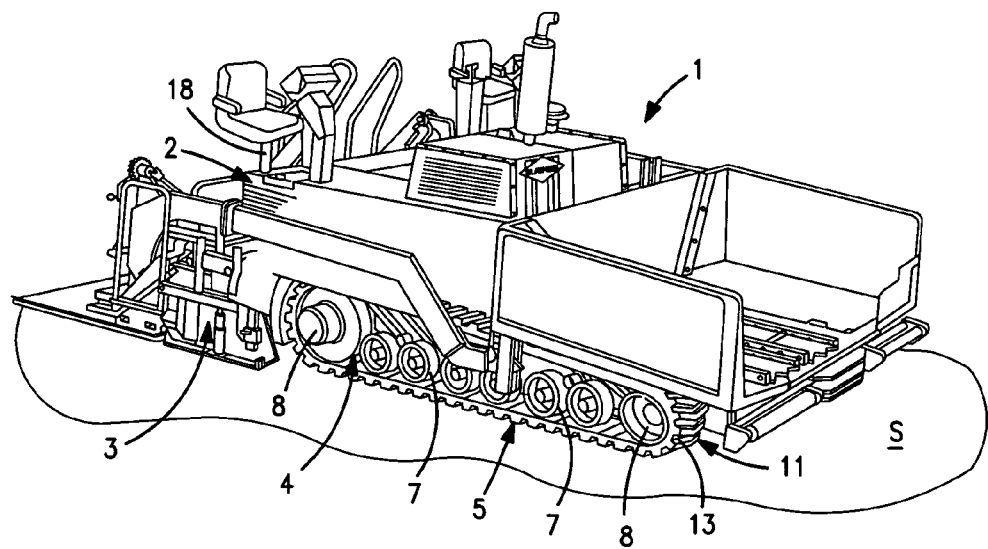
FIG. 1 is perspective view of a typical paving vehicle having known endless tracks (only one shown)
Figure 2:
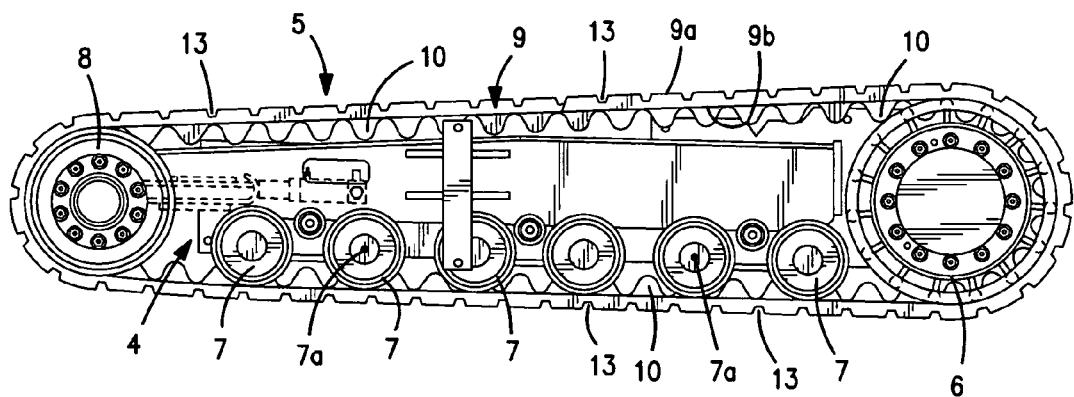
FIG. 2 is a side elevational view of a paving vehicle wheel train with the known endless track.
Figure 3:
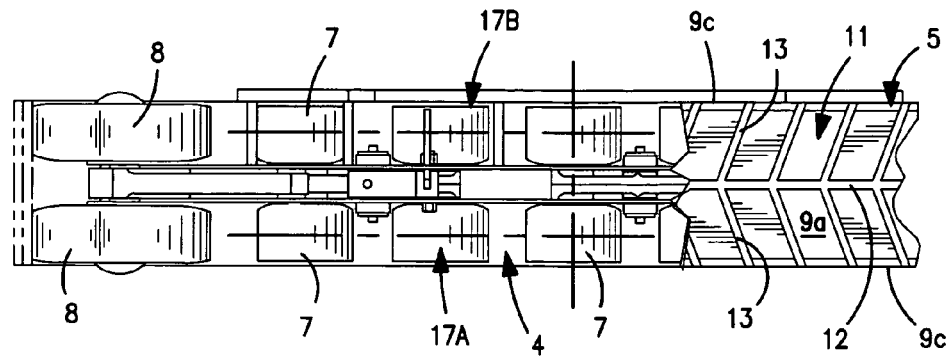
FIG. 3 is a broken-away, top elevational view of the wheel train assembly of FIG. 2.

Certain terminology is used in the following description for convenience only and is not limiting. The words "inner", "inward" and "outer", "outward" refer to directions toward and away from, respectively, the geometric center (not indicated) of an improved track. The words "front", "frontward" and "rear", "rearward" refer to directions generally toward and away from, respectively, the front (not indicated) of a paving vehicle. Also, the words "longitudinal" and "longitudinally" refer to directions generally parallel to a designated longitudinal axis of the track. Further, the words "transverse" and "transversely" refer to directions extending generally perpendicularly across or between designated lateral edges of the track, thereby also extending generally perpendicularly to the longitudinal axis. Furthermore, the words "radial" and "radially" refer to directions generally perpendicularly toward or away from the cylindrical axis (not indicated) of the track, which is generally annular or cylindrical as discussed below. The terminology includes the words specifically mentioned above, derivatives thereof, and words or similar import.

Referring now to the drawings in detail, wherein like numbers are used to indicate like elements throughout, there is shown in FIGS. 5–12 a presently preferred embodiment of an endless drive track 20 for a wheel train 4 for mobilizing or propelling a construction vehicle 1 upon a ground surface S. The wheel train 4 includes at least one drive wheel 6 and at least one and preferably a plurality of bogie wheels 7, the bogie wheels 7 each being rotatable about a central axis 7a. The endless drive track 20 basically comprises an endless body or belt 22 disposable about the wheel train 4 and having a driven portion 28 engageable by the drive wheel 6 such that the drive wheel 6 circulates the track 20 about the wheel train 4. The belt body 22 further includes an endless, generally annular rail portion 26 connected with the driven portion 28 and having a generally annular body 34 with an enclosed circular perimeter or circumference 35, as discussed below. The rail portion 26 has a substantially continuous inner circumferential surface 36, the inner surface 36 being contactable with one or more bogie wheels 7 such that each such bogie wheel 7 is rollable along the rail inner surface 36. Also, the rail portion 26 has a substantially continuous outer circumferential surface 38 contactable with the ground surface S.

Figure 8:
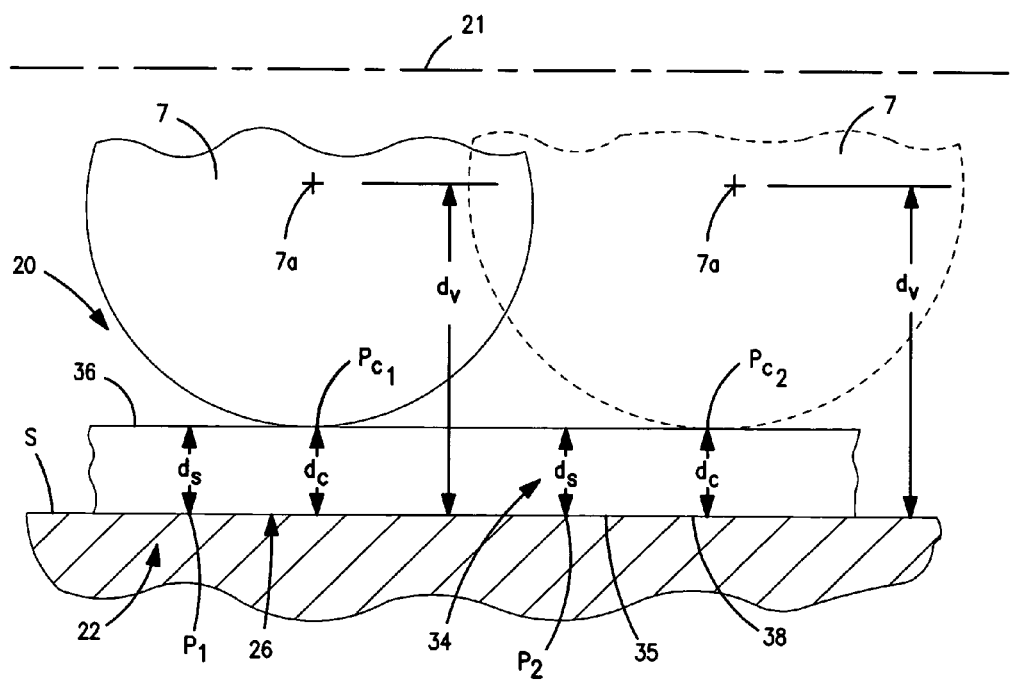
FIG. 8 is an enlarged, broken-away more diagrammatic side view of a rail portion of the present drive track, showing a bogie wheel in two different positions on the rail.

Further, as indicated in FIGS. 7 and 8, the rail body 34 has a substantially constant "longitudinal" thickness $t_L$, or a thickness about a longitudinal cross-section 25 (as described below), such that a spacing distance $d_S$ between the inner and outer rail surfaces 36, 38, respectively, at any point (e.g., $P_1$) on the circumference 35 is substantially equal to the spacing distance $d_S$ between the two surfaces 36 and 38 at any other point (e.g., $P_2$) on the circumference 35. As such, the rail portion 26 is configured to support the bogie wheel or wheels 7 above the ground surface S such that when the track 20 circulates about the wheel train 4, a perpendicular, vertical distance $d_V$ between each bogie wheel axis 7a (FIG. 8) and the ground surface S remains substantially constant as each bogie wheel 7 rolls along the rail inner surface 36. Each of the above basic elements of the endless track 20 of the present invention is described in further detail below.

Referring to FIGS. 1–3, 5 and 6, as discussed above, the belt body 22 is configured to demountably engage around or about the wheel train 4 of the vehicle 1 such that the wheel train 22 and the track 20 function in combination to mobilize or propel the construction vehicle 1 upon the ground surface S. Preferably, the construction vehicle 1 is a conventional paving vehicle 1 having two wheel trains 4 mounted on opposing lateral sides 2a (only one shown) of the vehicle chassis 2, such that the vehicle 1 utilizes two of the drive tracks 20 of the present invention. Each wheel train 4 preferably includes one drive wheel 6, a plurality of roller or bogie wheels 7 and a take-up wheel 8. As used herein, the term "bogie" wheel is intended to encompass any type of wheel of a vehicle wheel train which is driven by an endless track and which rolls upon portions of the track in contact with the ground or other base surface.

Most preferably, the bogie wheels 7 are connected to the vehicle chassis 2 by means of one or more bogie frames 12, each frame 12 being mounted on a stub shaft 14 extending outwardly from a proximal side 2a of the chassis 2. Specifically, four bogie wheels 7 are mounted to each bogie frame 12 so as to form front and rear pairs of laterally spaced-apart wheels 7. Each pair of wheels 7 is mounted to a common axle 15 such that the axes 7a of the two wheels 7 are substantially collinear. Thus, the plurality of bogie wheels 7 of the wheel train 4 are arranged in outer and inner lines 17A and 17B, respectively, of bogie wheels 7 that extend parallel to each other and generally along the proximal side 2a of the chassis 2. Preferably, the bogie frames 12 are pivotally mounted on the stub shafts 14 such that the frame 12 is able to pivot or oscillate in frontward and rearward directions, thereby permitting the bogie wheels 7 to vertically displace in order to traverse obstacles or objects (e.g., a stone) on the ground surface S.

Although the drive track 20 of the present invention is preferably used with a paving vehicle wheel train 4 as described above, the drive tracks 20 may be used with any other type of tracked construction vehicles 1. For example, the present drive tracks 20 may be used on agricultural tractors, track loaders, excavators, or mobile drilling machines. Further, the drive tracks 20 of the present invention may be used with any other type of wheel train structure, for example, a wheel train 4 having a single line of bogie or roller wheels 7 as opposed to pairs of parallel wheels 7. The scope of the present invention is not limited by any specific applications of the drive track 20 but encompasses all appropriate uses of the track 20 that benefit from the advantages as described herein.

Figure 6:
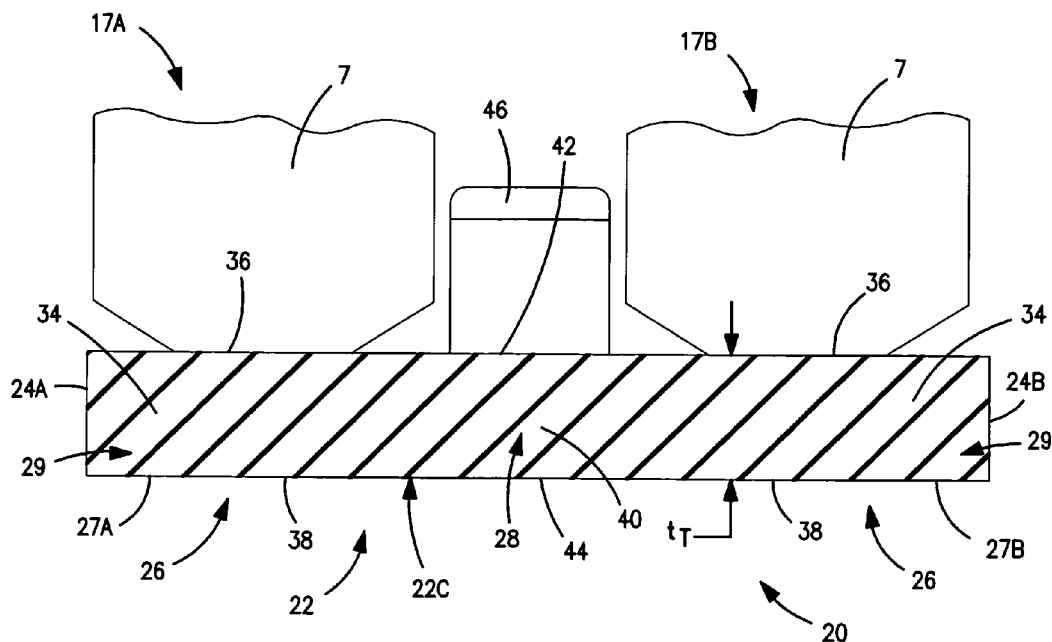
FIG. 6 is broken-away, transverse cross-sectional view of the present drive track, shown without a tread pattern.

Still referring to FIGS. 5 and 6, the belt body 22 preferably has also two opposing outer lateral edges 24A, 24B and a longitudinal axis 21 extending through a frontwardmost and a rearwardmost portion 22a, 22b, respectively, of the body 22 and generally centered between the two edges 24A, 24B. As discussed above, the belt body 22 includes at least one rail portion 26 and one driven portion 28 spaced transversely or laterally from the rail portion 26, such that the two portions 26 and 28 are disposed generally between the two body edges 24A and 24B. The rail and driven portions 26 and 28 each extend about the entire perimeter or circumference 35 of the belt body 22, such that each portion 26 and 28 is "endless", as discussed in further detail below.

Referring to FIGS. 6, 9 and 10, in a first preferred structure of the drive track 20, the belt body 22 includes two rail portions 26 disposed between the two belt edges 24A, 24B, each rail portion 26 being disposed on a separate transverse side of the driven portion 28 (see, e.g., FIG. 6). Specifically, the drive track 20 preferably has an "outer" rail portion 27A located proximal to the lateral edge 24A facing away from the chassis side 2a and another or "inner" rail portion 27B located proximal to the lateral edge 24B facing toward the chassis side 2a. Preferably, the two rail portions 27A and 27B are substantially identically constructed, with the outer rail portion 27A engaging with (i.e., contacting, driving and supporting) the outer line 17A of bogie wheels 7 and the inner rail portion 27B engaging with the inner line 17B of bogie wheels 7.

More specifically, each rail portion 27A, 27B includes a generally annular rail body 34 having a continuous outer circumferential surface 38 contactable with the ground surface S and a continuous inner circumferential surface 36. The inner surface 36 of the outer rail portion 27A is contactable with the wheels 7 of the outer wheel line 17A and the inner surface 36 of the inner rail portion 27B is contactable with the wheels 7 of the inner wheel line 17B. Further, the two rail portions 27A, 27B are each configured to support the bogie wheels 7 of the associated wheel line 17A and 17B so as to maintain substantially constant essentially the same vertical distance $d_V$ between the ground surface S and each wheel axis 7a of all the wheels 7 (i.e., of both wheel lines 17A, 17B).

Figure 11:
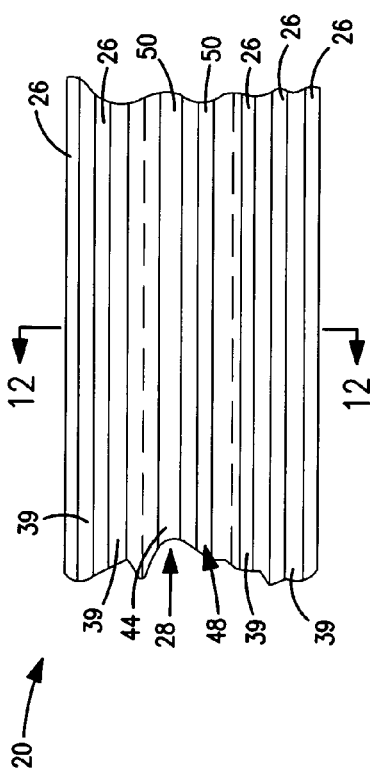
FIG. 11 is a broken-away side view of the drive track of the present invention shown with a second tread pattern.
Figure 12:
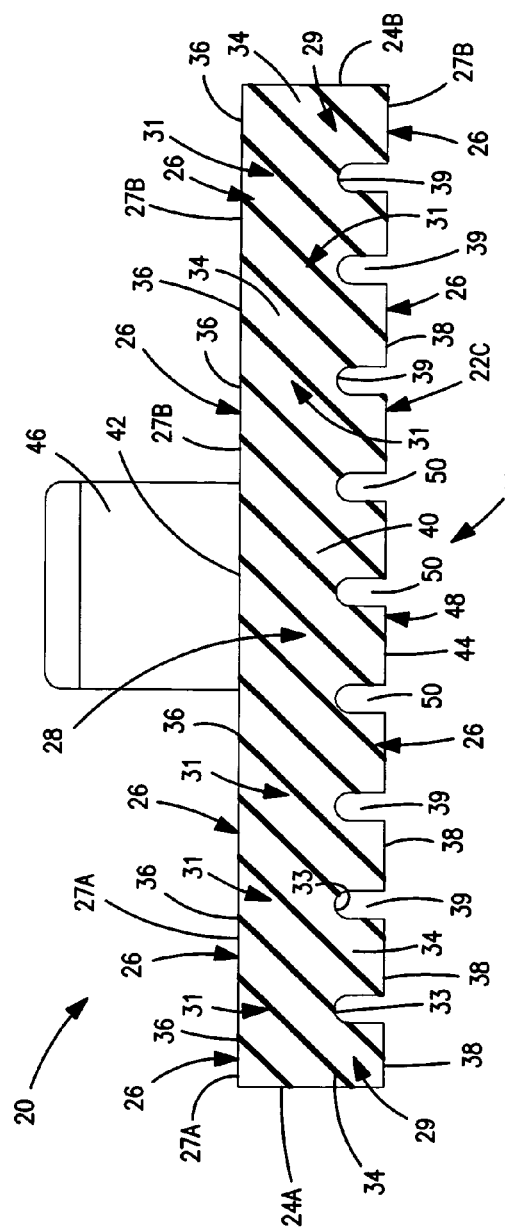
FIG. 12 is a transverse cross-sectional view of the present drive track through line 12—12 of FIG. 11.

Referring to FIGS. 11 and 12, in a second preferred structure of the drive track 20, the belt body 22 includes at least two outer rail portions 27A and/or two inner rail portions 27B, each pair of two inner and two outer rail portions 27A and 27B, respectively, being spaced laterally apart and disposed between each proximal belt edge 24A, 24B, respectively, and the driven portion 28. As such, at least two outer rail portions 27A or two inner rail portions 27B are contactable with and support each bogie wheel 7. In other words, each bogie wheel 7 of the outer wheel line 17A is rollable simultaneously along the inner surfaces 36 of the two or more "outer" rail portions 27A such that all the outer rail portions 27A concurrently support the bogie wheel 7 above the ground surface S. Further, each wheel 7 of the outer wheel line 17B is rollable simultaneously along the inner surfaces 36 of the two or more "inner" rail portions 27B, the inner rail portions 27B functioning together to support the wheel 7 above the ground surface S. Preferably, three or more outer rail portions 27A and three or more inner rail portions 27B are disposed between each respective belt edge 24A, 24B and the driven portion 28, such that the belt body 22 includes a plurality of the rail portions 26 spaced laterally across the transverse width of the body 22 on both sides of the driven portion 28.

Preferably, all of the rail portions 26, i.e., both the outer and inner rail portions 27A and 27B, are substantially identically constructed and are connected together by intermediate connective portions 31 of the belt body 22. More specifically, each pair of two adjacent rail portions 26 are connected or joined together by a separate generally annular connective portion 31 disposed between the two rail portions 26. Each connective portion 31 has an outer circumferential surface 33 recessed from the belt outer surface 22c so as to be spaced inwardly with respect to the outer rail surfaces 36 of the adjacent rail portions 26. As such, a generally annular recess 39 is defined between the two adjacent rail portions 26 to provide tread pattern recesses, as discussed below. As the connective portions 31 do not contact or engage with the ground surface S, the connective portions 31 do not directly function to propel the paving vehicle 1.

Referring again to FIGS. 5–12, the generally annular body 34 of each rail portion 26 is formed so as to be generally solid without any transversely-extending recesses or voids. The inner circumferential "rolling" surface 36 of each outer or inner rail portion 27A or 27B, respectively, is disposed on an inner radial side of the rail body 34 and is configured to frictionally engage with each bogie wheel 7 of the associated wheel line 17A or 17B, respectively. As such, portions of each rail rolling surface 36 continuously contact and drive each wheel 7 of the associated wheel line 17A or 17B to rotate about the central wheel axis 7a as the drive track 20 circulates about the wheel train 4. Further, the outer circumferential "ground-engaging" surface 38 of each rail portion 26 is disposed on an outer radial side of the rail body 34, so as to be spaced radially outwardly from the rolling surface 36, and is configured to frictionally engage with the ground surface S. Such engagement between portions of the belt ground-engaging surfaces 38 and the ground surface S cause the track 20 to propel or "pull" the chassis 2, and thus the entire vehicle 1, along the ground surface S.

Referring to FIGS. 7 and 8, as discussed above, each rail body 34 is formed having a thickness $t_L$ that is substantially constant at all points or positions about the entire perimeter of the body 34, which establishes the substantially constant spacing distance $d_S$ between the inner, rolling surface 36 and the outer, ground-engaging surface 38. FIG. 7 depicts one "longitudinal" cross section 25 of the rail portion 26; in other words, a cross-section defined by a plane (not indicated) extending longitudinally through the rail portion 26 and generally parallel with respect to the body longitudinal centerline 21. At each point/position P about the longitudinal cross-section 25, four randomly-selected points $P_1$, $P_2$, $P_3$ and $P_4$ along the rail body outer circumference 35 being indicated in FIG. 7, the value of the thickness $t_L$, and thus the value of the spacing distance $d_S$, is substantially equal to the value of the thickness $t_L$/spacing distance $d_S$ at any (and all) other points $P_1$, $P_2$, $P_3$ or $P_4$ along the circumference 35. The thickness $t_L$ and the spacing distance $d_S$ are described and depicted (FIGS. 7 and 8) with reference to points/positions on the indicated outer circumference 35 for convenience only. As such, any other perimeter reference (e.g., the rail body inner circumference (not indicated)) may alternatively be used to describe the features of the drive track 20 of the present invention without changing the essence thereof.

The constant spacing distance $d_S$ between the inner, rolling surface 36 and the outer, ground-engaging surface 38 enables each bogie wheel 7 to remain at a substantially constant vertical distance or height with respect to the ground surface S as the wheel 7 rolls along the entire inner perimeter of one or more rail portions 26, as discussed in further detail below. Further, each rail body 34 is also preferably formed such that all transverse cross-sections 29 (i.e., defined by transversely-extending planes) of the rail body 34 have a substantially identical size and shape, and preferably a thickness $t_T$, that is substantially constant at all points/positions across the transverse width of the rail body 34, as shown in FIGS. 6, 10 and 12. Alternatively, the rail bodies 34 may each be formed such that the two rail surfaces 36 and 38 converge or diverge in transverse directions between the belt edges 24A, 24B (neither shown).

Referring now to FIGS. 5, 6, 9, 10 and 12, the driven portion 28 of the belt body 22 preferably includes a generally annular body 40 having an inner circumferential surface 42 and an outer circumferential surface 44. A plurality of teeth or lugs 46 are spaced circumferentially about and project radially-inwardly from the driven portion inner surface 42. The teeth/lugs 46 of the driven portion 28 are configured to engage with the drive wheel(s) 6 of the associated wheel train 4 such that the drive wheel(s) 6 pull or "drive" the endless track 20 to continuously circle about the wheel train 4. Preferably, the driven portion body 40 further includes a tread pattern 48 formed of a plurality of grooves or recesses 50 extending into body 40 from the outer surface 44, the recesses 50 being configured to increase traction between the driven portion outer surface 44 and the ground surface S, as is generally known. FIGS. 9 and 10 depict a drive track 20 having only a central tread pattern 48 provided in the driven portion 28. FIGS. 11 and 12 indicate a tread pattern 48 extending across the entire belt outer surface 22c formed by the recesses 50 in the driven portion 28 and the recesses 39 formed by the connective portions 31 joining a plurality of inner and outer rail portions 27A, 27B, respectively. Alternatively, the drive track 20 may be formed without a tread pattern, as depicted in FIG. 6, such that the belt outer surface 22c is substantially "smooth".

Preferably, the belt 22 is fabricated from several arcuate sections (not indicated) of a polymeric material, such as natural or synthetic rubber, each such section having the rail portion(s) 26 and the driven portion 28 integrally formed together. The arcuate sections are molded or fused together end-to-end form a substantially integral annular belt of material. Alternatively, the belt body 22 may be formed as a single molded piece of material (i.e., one-piece construction) having both the rail portion(s) 26 and the driven portion 28 integrally formed together. As a further alternative, the belt body 22 may be constructed by providing the rail portion(s) 26 and the driven portion 28 as separate, generally annular components that are joined or fastened together by any appropriate means. Furthermore, the separate sections of such a belt structure may be fabricated from different materials, such as for example, one or more polymeric rail portions 26 joined with a metallic driven portion 28. The scope of the present invention encompasses all appropriate materials and manufacturing processes for forming the endless drive track 20 and is in no manner limited thereby.

Referring specifically to FIG. 8, when using the endless drive track 20 of the present invention with a vehicle wheel train 4, as the track 20 circulates about the train 4, the bogie wheels 7 each roll upon one or more rail portions 26 of the track 20. As each wheel 7 rolls between different positions (e.g., points $P_{C1}$ and $P_{C2}$) along the rail rolling surface(s) 36, the distance $d_C$ between each point of contact $P_C$ (between the wheel 7 and the rail portion 26) and the ground surface S remains substantially constant due to the constant rail body thickness $t_L$ and the constant spacing distance $d_S$ between the inner and outer rail surfaces 36, 38. As such, the distance $d_V$ between the central wheel axis 7a of each bogie wheel 7 and the ground surface S also remains substantially constant. Thus, the bogie wheels 7 of the drive train 4 do not vertically displace by rolling engagement with the drive track 20. However, the bogie wheels 7 may otherwise vertically displace with respect to the paver chassis 2, such as when the drive track 20 and wheels 7 travel over an obstruction on the ground surface S (e.g., a branch or rock).

Figure 4:
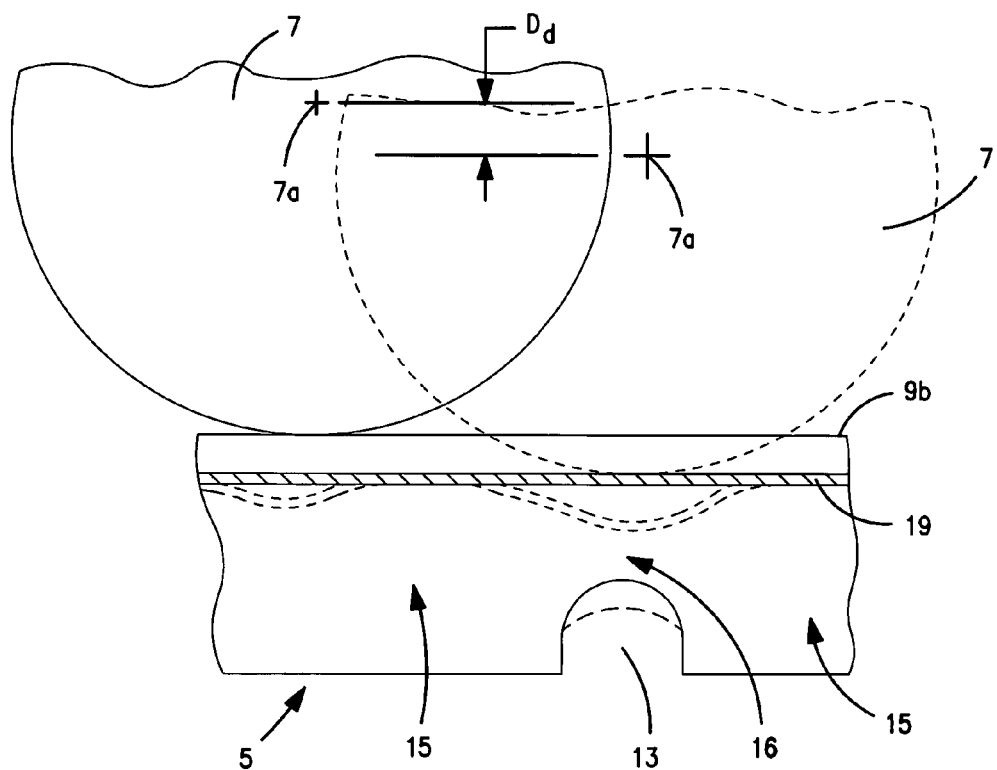
FIG. 4 is a greatly enlarged, broken-away, more diagrammatic side view of the known drive track, showing a bogie wheel in two different positions on the track.

The benefits of preventing bogie wheel vertical displacement, as described above, are most clearly understood by comparing the performance of the present drive track 20 with the performance of previously known, polymeric endless tracks 5, such as described above in the Background section of this disclosure. Referring to FIG. 4, with a known endless track 5, as the track 5 is driven about a wheel train 4, each bogie wheel 7 rolls along the belt inner surface 9b so as to travel alternatively over generally solid belt sections 15 and recessed belt sections 16. When a bogie wheel 7 rolls from over a solid belt section 15 to over a recessed belt section 16, the wheel 7 displaces vertically downward a distance $D_d$ due to downward deflection of the track material at the recessed section 16, as depicted by dashed lines in FIG. 4. Then, when traveling from over the recessed belt section 16 to over the next solid track section 15, the wheel 7 displaces vertically upwardly (not indicated) by about the same distance $D_d$ to reach the upper surface of the solid belt section 15, as the solid sections 15 do not bend or deflect downwardly when the wheel 7 travels over such sections 15 (i.e., other than due to material compression).

The described sequence of upward and downward vertical displacements of a bogie wheel 7 occurs repetitively and continuously with each bogie wheel 7 as the endless track 5 moves about the associated wheel train 4. Thus, each of the several bogie wheels 7 of the two paving vehicle wheel trains 4 is essentially vertically oscillating at a relatively low frequency during movement of the vehicle 1 along or upon a ground surface S.

The above-described simultaneous vertical oscillations of all the bogie wheels 7 is believed to generate significant vibrations that are experienced throughout the entire vehicle 1, these vibrations being substantially caused by the structure of previously known endless tracks 5 (as discussed above). To confirm this belief, tests were conducted wherein vibration of the operator seat post 18 of the paving vehicle 1 was measured in several directions as the paving vehicle 1 traveled along a ground surface S, first with the paving vehicle 1 being propelled using a set of previously known endless tracks 5 and then with the same vehicle 1 being propelled using a set of endless drive tracks 20 in accordance with the present invention.

From these tests, it was determined that the vibration levels measured at the operator post 18 was reduced for a paving vehicle 1 using the present endless drive tracks 20, as compared to vibrations measured at the post 18 when the vehicle 1 was equipped with a set of previously known endless tracks 5, by the following amounts:

| | |
|---|---|
| Front-to-back of machine | 254% reduction |
| Side-to-side of machine | 354% reduction |
| Vertical direction | 259% reduction |

As is readily apparent from these test results, the use of the present drive tracks 20 on a paving vehicle 1 significantly reduces the level of vibration experienced in such a vehicle 1. The reduction in vibration level results from the bogie wheels 7 rolling upon track rail portions 26 which are substantially solid and of substantially uniform thickness.

In addition, as shown in FIG. 4, with previously known track structures, the bogie wheels 7 cause reinforcing cables 19 in the track 5 to be bended or flexed at those cable portions that extend through a recessed belt section 16. As the solid rail portions 26 do not have any sections that bend or deflect relative to other rail sections, the breakage rate of such cables 19 is substantially reduced for the present drive tracks 20. Finally, the elimination of any track sections that bend/deflect by any substantial amount relative to other track sections significantly reduce shock loading on the drive track 20 of the present invention, which should substantially increase the life of the material used to fabricate the track 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally described herein.

We claim:

1. An endless drive track for a wheel train for mobilizing a construction vehicle upon a ground surface, the wheel train including a drive wheel and first and second bogie wheels, the drive track comprising:

a generally annular driven portion disposable generally about the wheel train and engageable by the drive wheel such that the drive wheel circulates the track about the wheel train;

a first endless rail portion spaced laterally from and connected with the driven portion, the first rail portion having an endless generally annular body with a circumference extending about the entire perimeter of the body, a substantially continuous inner circumferential surface disposed on a first side of the body and contactable with the first bogie wheel, and a substantially continuous outer circumferential surface disposed on a second, opposing side of the body and contactable with the ground surface, the rail body having a thickness with a substantially constant value about the circumference such that a spacing distance between the inner and outer surfaces of the first rail portion at any point on the circumference is substantially equal to the spacing distance between the inner and outer surfaces at any other point on the circumference; and a second endless annular rail portion spaced laterally from the first rail portion such that the driven portion is disposed generally between the first and second rail portions, the second rail portion having an endless, generally annular body with a circumference extending about the entire perimeter of the body, a substantially continuous inner circumferential surface disposed on a first side of the second rail body and contactable with the second bogie-wheel, and a substantially continuous outer circumferential surface disposed on a second, opposing side of the second rail body and contactable with the ground surface, the second rail body having a substantially constant thickness such that a spacing distance between the inner and outer surfaces of the second rail portion at any point on the second rail circumference is substantially equal to the spacing distance between the inner and outer surfaces of the second rail portion at any other point on the second rail circumference;

wherein the driven portion further includes a circumferential inner surface and a plurality of lugs spaced circumferentially about and projecting inwardly from the driven portion inner surface, each lug being engageable by the drive wheel to circulate the track about the wheel train and an outer circumferential surface contactable with the ground surface, and a plurality of recesses spaced circumferentially about and extending into the driven portion from the driven portion outer surface, the recesses being configured to increase traction between the driven portion outer surface and the ground surface.

2. The endless track as recited in claim 1 wherein each bogie wheel is rotatable about a central axis and rollable along the rail inner surface, the first rail portion is configured to support the first bogie wheel and the second rail portion is configured to support the second bogie wheel such that when the track circulates about the wheel train, a distance between first bogie axis and the ground surface remains substantially constant as the first bogie wheel rolls upon the first rail inner surface and a distance between second bogie axis and the ground surface remains substantially constant as the second bogie wheel rolls upon the second rail inner surface.

3. An endless drive track for a wheel train for mobilizing a construction vehicle upon a ground surface, the wheel train including a drive wheel and a bogie wheel, the drive track comprising:

a generally annular driven portion disposable generally about the wheel train and engageable by the drive wheel such that the drive wheel circulates the track about the wheel train, the driven portion including an inner circumferential inner surface, an outer circumferential surface contactable with the ground surface, a plurality of lugs spaced circumferentially about and projecting inwardly from the inner surface, each lug being engageable by the drive wheel to circulate the track about the wheel train, and a plurality of recesses spaced circumferentially about and extending into the driven portion from the outer surface, the recesses being configured to increase traction between the outer surface and the ground surface; and an endless rail portion spaced laterally from and connected with the driven portion, the rail portion having a generally annular body with a circumference, a substantially continuous inner circumferential surface disposed on a first side of the body and contactable with the bogie wheel, and a substantially continuous outer circumferential surface disposed on a second, opposing side of the body and contactable with the ground surface, the rail body having a thickness with a substantially constant value about the circumference such that a spacing distance between the inner and outer rail surfaces at any point on the circumference is substantially equal to the spacing distance between the two surfaces at any other point on the circumference.

* * * * *